UNITED STATES PATENT OFFICE.

FRANKLIN R. CARPENTER, OF DENVER, COLORADO, ASSIGNOR TO THE AMERICAN IRON AND STEEL ALLOYS COMPANY, OF DENVER, COLORADO, A CORPORATION OF COLORADO.

PROCESS OF TREATING METALLIFEROUS ORES.

No. 904,838.  Specification of Letters Patent.  Patented Nov. 24, 1908.

Application filed June 7, 1907. Serial No. 377,804.

*To all whom it may concern:*

Be it known that I, FRANKLIN R. CARPENTER, a citizen of the United States of America, residing in Denver, in the county of Denver and State of Colorado, have invented a new and useful Process of Treating Metalliferous Ores, of which the following is a specification.

There exist many large deposits of ores mainly copper ores, and gold and silver ores having a gangue that is largely silica or silicates. Examples of such copper ores are found in the so called monzonite deposits of Nevada and Utah, in which the copper is mainly in the sulfid form but is so finely disseminated that the losses by mechanical concentration are very great and owing to the vast amount of basic flux and the fuel required it does not pay to smelt these ores direct.

Examples of the gold ores which, for similar reasons can neither be smelted nor concentrated, are the silicious ores of the Black Hills, South Dakota, and certain quartz-like ores in Nevada. I have discovered a method of treatment for these ores in which they are separated without fusing the gangue to effect a separation.

In the old Welch method of copper smelting, silicious copper ores were treated by a process of "soaking", but this was really a smelting process in which slag enough was made to float off the unfused quartz fragments, without which slag it was impossible to skim the furnace. It was moreover a very costly process owing to the large amounts of fuel used. One might pass crushed ore over a bed of molten matte or metal and gradually soak out the values, but unless sufficient slag was formed to float or wash out the unaltered rock, the furnace could not be skimmed,—except at a great loss of the underlying matte or metal.

In carrying out my invention I may conveniently use a reverberatory furnace which may be fired in the ordinary way. The furnace hearth may be of any desired shape. A circular form with the ore fed near the center and gradually worked outwardly would give good results, but for the purpose of illustrating my process I will assume an ordinary reverberatory smelting furnace of the Welch type fired in the usual way, such as is used by all smelters where copper ores are smelted by the reverberatory process.

Upon the hearth of this furnace there is provided a fixed bath which may be a bed of molten matte, either copper or iron, or a mixture of the two metals, or a bed of lead or other metal, the specific gravity of which, however, should be less than that of the ore, but greater than that of the gangue. Upon this bed I place crushed ore of earthy or silicious gangue carrying metals of value, which latter are separated from the gangue by contact with the molten matte or metal, and without actually fusing the ore, no flux being used and no slag being formed and a relatively small amount of fuel for heating being employed. In the old Welch process referred to, enormous heat was required, a flux was usually employed and the ore was smelted producing a slag which was of greater specific gravity than the silicious ore so that this ore did not come in contact with the bath but floated on top of the slag.

In my process the metallic values are either dissolved in the molten bath or such as are of greater specific gravity than the bath will sink through it, but as this bath is of greater specific gravity than the gangue, the latter will be neither dissolved in, nor sink through the bath, but will merely float on it and can be readily removed in well known ways.

It is sometimes desirable with certain ores to provide means for more readily skimming the furnace so as to avoid loss of matte or metal and it is also desirable in some cases to prevent any oxidizing action either of the ore or of the bath. In my application for Patent No. 325,546, filed July 10, 1906, I have described a method of treating ores in which a medium is provided which does not to any extent combine with the ore or with the bath, but allows the leaching, separating of values, and the skimming of the furnace without actually fusing earthy portions of the ore. This substance or medium is fusible at comparatively low temperature and acts partially as a mechanical concentrating medium, but mainly as a medium that can be used for washing out and floating off the freed rock. This medium is of less specific gravity than the bath and is neutral to it as well as to the ore. According to the invention claimed in the present application, which covers a method of treatment suitable for some ores, no such medium interposed between the ore and the bath is employed.

When I speak of the metals being dissolved in or passing through the bath, I, of course, intend to include compounds of the metals, such as sulfids. The method of treatment may be employed with mixed ores. Such metals or compounds thereof as are soluble in the bath, or are of greater specific gravity than the bath will be separated from the ore, while those which are not soluble in the bath, or are of less specific gravity than the bath, will remain on the surface thereof with the gangue. The underlying dissolving and separating bath may be composed of suitable metal or matte, or it may be a silicate of definite specific gravity, or in some cases it may consist of sulfur. Other substances suitable for the same purpose will readily suggest themselves to those skilled in metallurgical matters.

Another characteristic of the bath is that while it is solid at ordinary temperatures, it is fusible at a comparatively low temperature.

My treatment of the ores may be considered a concentrating treatment and may take the place of concentrating processes in which water is used, where water is scarce or not available.

In the specification and claims the term "ore" includes all the constituents of the ore, i. e., both the metallic values and the gangue.

I claim as my invention:—

1. The process of treating ores without the use of a flux and without producing a slag, which consists in feeding the ore onto the top of a molten bath of less specific gravity than the ore and of greater specific gravity than the gangue of such ore.

2. The process of treating ores by separating the metallic values from gangue without producing a slag and without the use of a flux, which consists in subjecting the native ore to a molten bath of less specific gravity than the ore and of greater specific gravity than the gangue of such ore.

3. The process of treating ores for separating metallic values from the gangue without the use of a flux and without producing a slag, which consists in feeding the ore onto the top of a molten bath of less specific gravity than the metallic constituents within the ore but of greater specific gravity than the separated gangue.

4. The process of treating ores without the use of a flux and without producing a slag, which consists in feeding the ore onto the top of a bath consisting of a substance solid at ordinary temperatures but fluid when heated and the specific gravity of which is less than that of the ore but greater than that of the gangue of such ore.

In testimony whereof, I have hereunto subscribed my name.

FRANKLIN R. CARPENTER.

Witnesses:
ARTHUR HOWE-CARPENTER,
CRANSTON HOWE CARPENTER.